United States Patent [19]
Namai et al.

[11] Patent Number: 4,769,664
[45] Date of Patent: Sep. 6, 1988

[54] BARREL DRIVING DEVICE FOR CAMERA

[75] Inventors: Akihiro Namai, Kanagawa; Akira Egawa; Takanori Kodaira, both of Tokyo, all of Japan

[73] Assignee: Canon Kabushiki Kaisha, Tokyo, Japan

[21] Appl. No.: 47,562

[22] Filed: Apr. 27, 1987

Related U.S. Application Data

[63] Continuation of Ser. No. 713,439, Mar. 19, 1985, abandoned.

[30] Foreign Application Priority Data

Mar. 19, 1984 [JP] Japan .................................. 59-51229
Mar. 19, 1984 [JP] Japan .................................. 59-51230

[51] Int. Cl.⁴ .............................................. G03B 3/10
[52] U.S. Cl. ..................................... 354/400; 354/402
[58] Field of Search ................... 354/195.1, 400, 403, 354/405, 448, 453, 235, 234.1, 258.1, 271.1, 402, 212, 213, 252; 74/575, 578, 576

[56] References Cited

U.S. PATENT DOCUMENTS

2,900,840  8/1959  Greve ..................................... 74/578
4,560,266 12/1985  Namai et al. ....................... 354/400

Primary Examiner—L. T. Hix
Assistant Examiner—Brian W. Brown
Attorney, Agent, or Firm—Toren, McGeady & Associates

[57] ABSTRACT

A barrel driving device for a camera including a distance adjusting ring having cam portions for axially moving a photographic lens barrel forward, ratchet teeth formed in the outer periphery of the distance adjusting ring, a ratchet arranged upon movement from an initial or first position to a second position to turn the distance adjusting ring in engagement with one of the ratchet teeth, and a pawl arranged upon engagement with one of the ratchet teeth to hinder the reverse movement of the distance adjusting ring, wherein there is provided a limiting member having an abutment surface against which the head of the ratchet abuts so that the ratchet is hindered from turning outwardly of the distance adjusting ring when it goes in the second position.

24 Claims, 4 Drawing Sheets

BARREL DRIVING DEVICE FOR CAMERA

This is a continuation of application Ser. No. 713,439, filed Mar. 19, 1985, now abandoned.

BACKGROUND OF THE INVENTION

1. Field of the Invention:

This invention relates to driving devices for moving the photographic lens barrel of a camera stepwise.

2. Description of the Prior Art:

The devices of this kind generally operate in such a manner that prior to making an exposure, the lens barrel is axially moved forward to focus on an object to be photographed, and after the exposure is completed, it is further moved forward until one cam moves away from the follower on the lens barrel so that the lens barrel is set in the initial position of the next cam and at the same time the drive circuit is rendered inoperative.

In the conventional devices of this kind, to minimize the time lag from the actuation of the release button through the focusing movement of the photographic lens to the start of opening of the shutter, there is a need for the ratchet to turn the distance adjusting ring at a high speed. As the number of cycles of reciprocating operation of the ratchet per unit time increases, however, the problem of increasing the possibility of occurrence of a faulty operation wherein the distance adjusting ring turns two ratchet teeth in one cycle of reciprocating operation by the inertia of the ring becomes serious.

SUMMARY OF THE INVENTION

An object of the present invention is to eliminate the above-described problem, and to prevent the distance adjusting ring from turning a longer distance than necessary by providing a member for hindering the ratchet from operating more than necessary.

Other objects of the invention will become apparent from the following description of embodiments thereof.

DETAILED DESCRIPTION OF THE PREFERRED EMBODIMENTS

Figure 1:
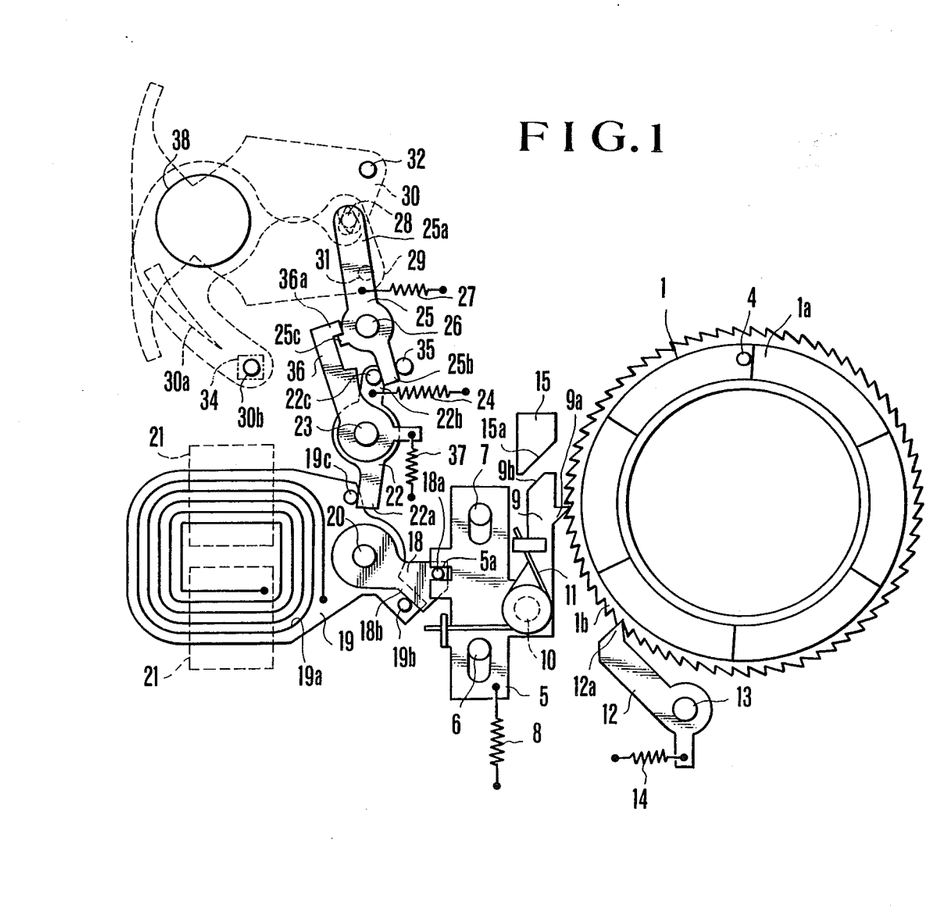
FIG. 1 is an elevational view of an embodiment of a barrel driving device for a camera according to the present invention.

An embodiment of the invention is next described by reference to the accompanying drawings. In FIG. 1, a distance adjusting ring 1 is arranged on the outer diameter of a photographic lens barrel 2 shown in FIG. 2 to be rotatable with the help of a ball bearing or the like for the purpose of smooth operation thereof. The barrel 2 is urged to the rear by a spring 3 and is axially movable while being restrained from rotation. On the front end of the ring 1 there are six focusing control cams 1a of similar shape successively arranged in a common circle to cooperate with a follower 4 on the barrel 2 which also serves as a member for finely adjusting the axial position of the barrel to focus on an infinitely distant object, so that when the distance adjusting ring 1 turns in a clockwise direction as viewed in FIG. 1, the barrel 2 is moved axially forward. Ratchet teeth 1b are formed in the outer periphery of the ring 1 throughout the entire length thereof. A reciprocating slide plate 5 has two slots in which engage respective pins 6 and 7 fixedly mounted on a base plate (not shown). A spring 8 urges the slide 5 to a downward direction. A ratchet 9 is pivotally mounted on a pin 10 of the slide plate 5. A spring 11 urges the ratchet 9 in a clockwise direction as viewed in FIG. 1 with its nose to engage one of the ratchet teeth 1b. The ratchet 9 has its head 9b formed to an inclining shape. A pawl lever 12 is pivotally mounted on a pin 13 fixedly monted to the base plate (not shown), and is urged by a spring 14 in a clockwise direction. Its pawl 12a when in engagement with one of the ratchet teeth 1b on the distance adjusting ring 1 restrains counter-clockwise movement of the distance adjusting ring which is exerted when the cam follower 4 pushes the cam 1a under the action of the spring 3 of the barrel 2. A limiting member 15 is fixedly mounted on the base plate (not shown) and has an abutment surface 15a against which the ratchet head 9b abuts when the ratchet 9 turns in the counter-clockwise direction as its pawl 9a moves away from the root of tooth in the uppermost position as viewed in the drawing.

A drive lever 18 and a rotor 19 are pivotally mounted on a common pin 20 fixedly mounted to the base plate (not shown). The drive lever 18 has a pin 18a extending into a cutout 5a of the reciprocating slide plate 5 so that when the drive lever 18 turns in a counterclockwise direction, the slide 5 moves upward. The rotor 19 has a printed coil 19a upon supply of current thereto to exert a magnetomotive force. With permanet magnet pieces 21, the rotorr 19 reacts to this force, rotating from an illustrated or neutral angular position to a counter-clockwise direction when the current flow to the coil 19a takes a certain direction, whereby the drive lever 18 is turned in a counter-clockwise direction by a pin 19b on the rotor 19 in engagement with the side edge 18b of the drive lever 18. When the direction of the current flow is reversed, the rotor 19 rotates from the illustrated position to a clockwise direction, whereby a shutter-mechanism is operated. Hereinafter, the direction of current low for driving the barrel will be called "normal" direction, and that of current flow for operating the shutter mechanrsm "reverse" direction.

A shutter drrve lever 22 is pivotally mounted on a pin 23 fixedly mounted to the base plate and is urged by a spring 24 in a clockwise direction so that its one arm 22a abuts on a pin 19c of the rotor 19. Therefore, when the rotor 19 turns clockwise, the shutter drive lever is turned in a counter-clockwise direction. A blade opening-closing lever 25 is pivotally mounted on a pin 26 fixedly mounted to the base plate, and is urged by a spring 27 in a clockwise direction. Its one arm 25a has a blade drive pin 28 fixedly mounted at the end and extending into slots of shutter blades 29 and 30. The shutter blades 29 and 30 are pivotally mounted on pins 31 and 32 respectively fixedly mounted to the base plate. When the lever 25 turns in the clockwise direction, therefore, the shutter blades 29 and 30 are opened from the illustrated position where they are closed. 34 is a photoelectric transducer element for light measurement; 30a is an auxiliary aperture opening for light measurement; 30b is a preceding opening for low brightness warning. The other arm 25b of the blade opening-closing lever 25 is urged by a spring 27 to abut on a pin 22c of the shutter drive lever arm 22b. Because the spring 24 of the shutter drive lever 22 is stronger than the spring 27, the shutter blades 29 and 30 are held in an aperture closing position defined by a stopper pin 35 for the lever 25. A blade latching lever 36 is pivotally mounted on the pin 23 and is urged by a spring 37 in a clockwise direction. At its free end there is a nose 36a abutting on the side edge of the lever 25. Soon after the lever 25 starts to turn, a projection 25c comes to engage the nose 36a. An exposure aperture 38 is formed in the base plate. Though this aperture 38 is actually aligned to the optical axis of the barrel 2, it is here depicted as out of alignment for the purpose of better understanding.

Figure 2:
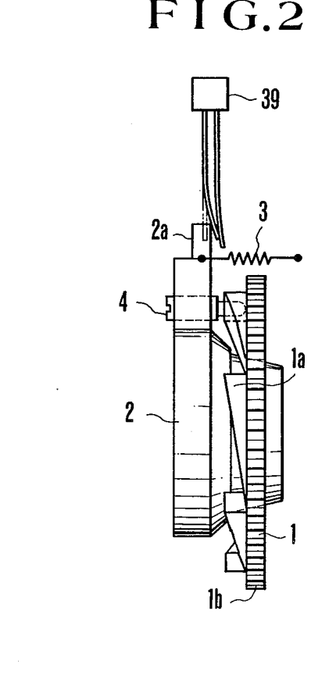
FIG. 2 is a side elevational view illustrating the relationship between the distance adjusting ring and the barrel of FIG. 1.

In FIG. 2, a lens stop switch 39 (hereinafter abbreviated to "LS" switch) is arranged adjacent an arm 2a of the barrel 2 to turn off when the barrel 2 moves axially forward some distance from the initial position and to turn on again when one of the cams 1a moves away from the follower 4.

Figure 3:
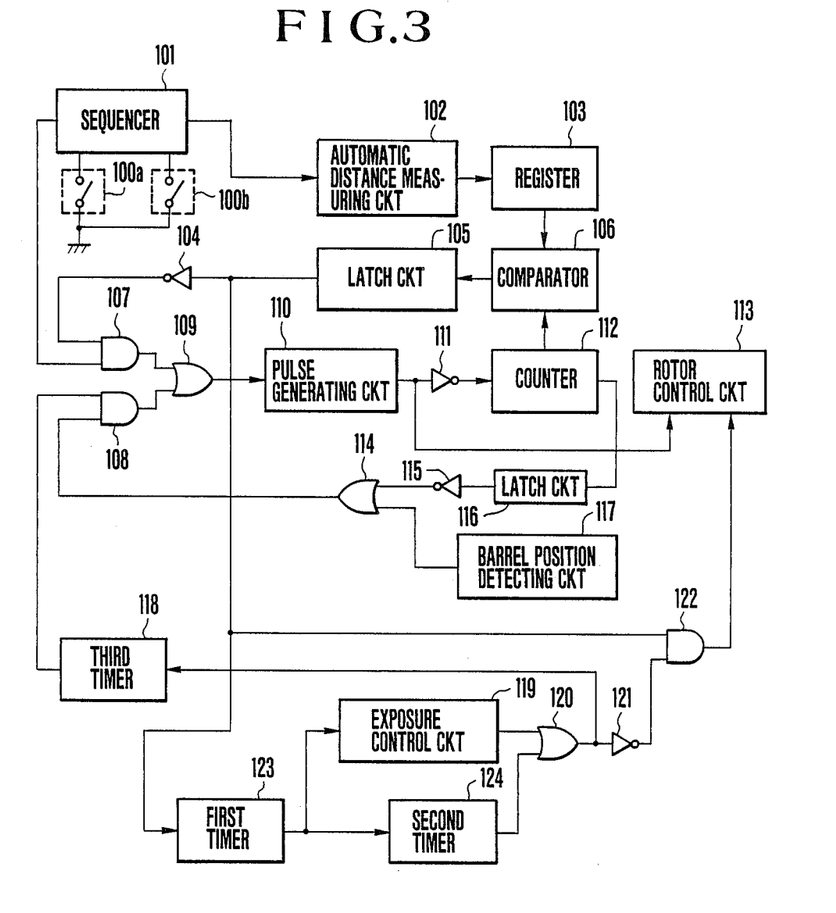
FIG. 3 is an electrical circuit diagram of the driving device of FIG. 1.
Figure 4:
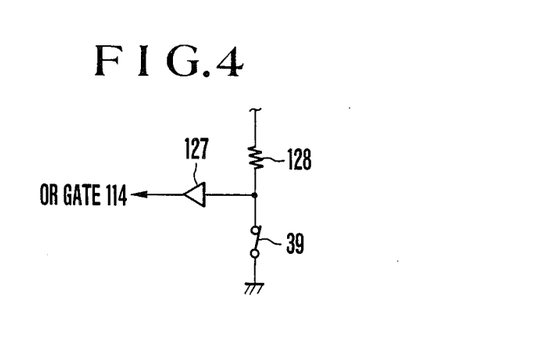
FIG. 4 illustrates the details of the barrel position detecting circuit of FIG. 3.
Figure 5:
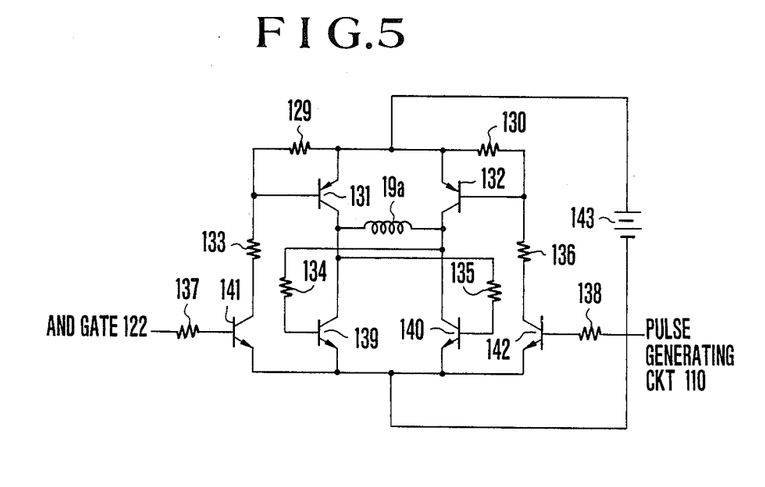
FIG. 5 illustrates the details of the rotor control circuit of FIG. 3.

Here shown in FIG. 3 is a control circuit for the barrel driving device shown in FIG. 1. A sequencer 101 for controlling the sequence of operations of the camera has a first switch 100a arranged to be closed when a release button is pushed down to a first stage, and a second switch 100b arranged to be closed when the release button is further pushed down to a second stage. An automatic distance measuring circuit 102 is rendered operative by a signal from the sequencer 101. The output of the circuit 102 representing the measured object distance is stored on a register 103. A latch circuit 105 receptive of the output of a comparator 106 produces an output which is then applied through an inverter 104 to an AND gate 107 at one input thereof, the other input of which is connected to another output of the sequencer 101. The output of this AND gate 107 and the output of another AND gate 108 are applied through an OR gate 109 to a pulse generating circuit 110. A train of pulses from the circuit 110 has a frequency suited to stepwise driving of the barrel 2, with ON and OFF times, for example, each in 10 msec. and are applied either directly to a rotor control circuit 113, or through an inverter 111 to a counter 112. As the output of this counter 112 is always compared with the output of the register 103 (the object distance information), when they come to coincide with each other, or when the lens is in focus, the output of the comparator 106 changes to a high level. The output of the counter 112 is also applied through a latch circuit 116, an inverter 115 and an OR gate 114 to the AND gate 108. The other input of the OR gate 114 is connected to the output of a barrel position detecting circuit 117 which, as shown in FIG. 4, comprises a pull-up resistor 128 connected to the LS switch 39 with their junction point connected to a buffer 127. When the barrel 2 lies at or near the initial position, the LS switch 39 is closed, causing the buffer 127 to produce an output of low level. After the barrel 2 has moved some distance from the initial position, the LS switch 39 is turned off, and a signal of high level from the buffer 127 is given to the OR gate 114. The output of the latch circuit 105 is also connected to an AND gate 122 at one input thereof, the other input of which is connected to the output of an inverter 121 having an input connected to the output of an OR gate 120. The output of this AND gate 122 is connected to another input of the rotor control circuit 113. This rotor control circuit, as shown in FIG. 5, comprises pull-up resistors 129 and 130, current limiting resistors 133 to 138, transistors 131, 132, and 139 to 142, and a battery 143. Now assuming that the pulse generating circuit 110 produces a first pulse, then the transistor 142 is turned on. The transistor 132 whose base is connected through the resistor 136 to the collector of the transistor 142 is also turned on. At the same time, another base current flows through the resistor 134 to the transistor 139 too, whereby the transistor 139 is turned on. As a result, the printed coil 19a on the rotor 19 is supplied with current flowing from the right to the left as viewed in FIG. 5, or in the normal direction. Alternatively assuming that the output of the AND gate 122 changes to high level, then the transistors 141, 131 and 140 are turned on, allowing current to flow through the printed coil 19a from the left to the right, or in the reverse direction.

Also the output of the latch circuit 105 is applied to a first timer 123. The output of this timer 123 is used for actuating an exposure control circuit 119 and a second timer 124. The outputs of the exposure control circuit 119 and the second timer 124 are connected to the respective inputs of the OR gate 120. The output of this OR gate 120 is connected to an input of a third timer 118 whose output is connected to another input of the AND gate 108, and is connected through the inverter 121 to the AND gate 122.

The operation of the device is as follows: When the release button is pushed down to the first stroke, the switch 100a is turned on, whereby the circuit is supplied with electrical power, and a first operation of the camera is started. An actuating signal from the sequencer 101 is applied to the automatic range finding circuit 102, whereby the object distance is measured in the form of a number of ratchet teeth by which the distance adjusting ring is to be turned from the initial position. This number is memorized in the register 103. Upon further depression of the release button, the switch 100b is turned on, whereby the battery is latched until the sequence of camera operations comes to end, and a signal of high level from the sequencer 101 is applied to the AND gate 107. Since the output of the latch circuit 105 in the initial state is of low level, this is inverted by the inverter 104 to 1 high level. Because this is applied to the other input terminal of the AND gate 107, the output of the AND gate 107 changes to a high level. The output of the OR gate 109 then changes from low to high level by which the pulse generating circuit 110 is rendered operative. For the first pulse of 10 msec. duration, the rotor control circuit 113 turns the rotor 19 in the counter-clockwise direction. During this, its pin 19b pushes the end portion 18b of the drive lever 18, turning the drive lever 18 also in the counter-clockwise direction. Such movement of the drive lever 18 is transmitted through the pin 18a-and-cutout 5a connection to upward movement of the reciprocating slide plate 5 along with the ratchet nose 9a in engagement with one of the ratchet teeth 1b, while turning the distance adjusting ring 1 in the clockwise direction. Because this operation is carried out at very high speed, the ditance adjusting ring gets a large inertia so that it tends to turn a longer distance than the stroke of pushing movement of the ratchet pawl 9a. When the ratchet pawl 9a has moved upward while pushing the ring 1, and reaches the uppermost position, as the distance adjusting ring 1 tends to further turn, the inclined surface of the next ratchet tooth 1b of the distance adjusting ring 1 pushes the ratchet pawl 9a, urging the ratchet 9 to turn in the counter-clockwise direction. At this time, the head 9b of the ratchet 9 comes to contact with the abutment surface 15a of the limiting member 15, whereby the distance adjusting ring 1 is prevented from further turning. It should be noted that the angle of inclination of this abutment surface 15a is previously determined to be larger than that of inclination of the ratchet tooth so that when the ratchet pawl 9a returns, the abutment surface 15a and the ratchet head 9b do not interfere with each other. Also when the distance adjusting ring 1 has turned by the prescribed distance, the lever pawl 12a enters the next root of tooth 1b to create a situation whereby the distance adjusting ring is retained in an advanced position by one tooth. In order to make sure of this operation, the distance adjusting ring 1 must be turned a longer distance than the length of one tooth 1b. Next, when the current supply to the rotor 19 is cut off, the reciprocating slide plate 5 starts to return to the initial position by the bias force of the spring 8. At the same time, the ratchet 9 and the rotor 19 with the drive lever 18 are returned to the initial position. The ratchet pawl 9a when in this returning operation turns in the counter-clockwise direction along the slope of one ratchet tooth to enter the next root of a tooth. As has been described above, however, the ratchet head 9b never interferes with the abutment surface 15a. Also, at a time when the ratchet 9 has lost the driving power, the distance adjusting ring 1 is turned in the counter-clockwise direction by the bias force of the spring of the barrel 2 as the cam 1a is pushed by the follower 4, and then stops in the normal position defined by the pawl lever 12. By a series of these operations, the distance adjusting ring 1 turns through the length of exactly one tooth of the ratchet 1b, and the barrel 2 is moved forward a corresponding distance to the one tooth by the cam 1a, which the other parts are returned to the initial position of FIG. 1. Such procedure repeats itself a corresponding number of times to the above-described object distance. Thus, the barrel 2 reaches an in-focus position.

Meanwhile, the output of the pulse generating circuit 110 after having been inverted by the inverter 111 is applied to the counter 112. Therefore, the count 112 counts each pulse in synchronism with the termination of duration of energization of the rotor 19. When the number of pulses counted by the counter 112 reaches the valve stored on the register 103, the comparator 106 produces an output of high level which is then latched by the latch circuit 105, and, further after having been inverted to t low level by the inverter gate 104, is applied to the AND gate 107, whereby the output of the AND gate 107 is changed to a low level, and the output of the OR gate 109 is also changed to a low level. Thus, the pulse generating circuit 110 is rendered inoperative, and, responsive to this, the rotor control circuit 113 stops the focusing operation by the rotor 19.

Also since the output of the latch circuit 105 is applied to one of the inputs of the AND gate 122, the other input of which has been supplied with the signal of high level from the inverter gate 121, the output of the AND gate 122 changes to a high level. Responsive to this, the rotor control circuit 113 supplies the rotor 19 with current flowing in the reverse direction therethrough. Thereby, the rotor 19 is turned in the clockwise direction, while its pin 19c turns the shutter drive lever 22 in the counter-clockwise direction. The pin 22c then strikes the side edge of the latch lever 36, causing the nose 36a to retract from the path of movement of the projection 25c of the blade opening-closing lever 25. The lever is therefore turned by the spring 27 in the clockwise direction, opening the shutter blades 29 and 30 to initiate an exposure.

Such change of the output of the latch circuit 105 further causes the first timer 123 to count the time from the moment at which the reverse current supply to the rotor 19 has been started to the moment at which the shutter blades 29 and 30 start to open the exposure aperture 38. At the end of the counting, the output of the first timer 123 then takes a high level, initiating an operation of the exposure control circuit 119 having the light meter with the photoelectric sensor 34. From this time onward, the sensor 34 receives light from an object to be photographed through the opening of the auxiliary diaphragm aperture 30a of the shutter blade 30. It is also at the change of the output of the first timer 123 to a high level that the second timer 124 also starts to operate, until a maximum allowable shutter time is counted. In the timing of the first occuring of the terminations of duration of a computed exposure time and the maximum allowable time, the output of the OR gate 120 changes to a high level. Then, the output of the inverter gate 121 changes to a low level and the ouptut of the AND gate 122 also changes to a level, whereby the reverse current supply to the rotor 19 is cut off by the control circuit 113. Therefore, the shutter drive lever 22 is turned by the spring 24 in the clockwise direction, while the pin 22c on its one arm 22b pushing the arm 25b of the blade opening-closing lever 25 to turn the lever 25 in the counter-clockwise direction. Thus, the shutter blades 29 and 30 are closed. Also at the same time, the other arm 22a of the shutter drive lever 22 pushes the pin 19c of the rotor 19 to turn the rotor 19 in the counterclockwise direction to the illustrated initial position. The time interval from the moment at which the output of OR gate 120 changes to a high level, or the reverse current supply to the rotor 19 is cut off to the moment at which the exposure aperture 38 has been entirely closed by the shutter blades 29 and 30, is counted by the third timer 118. When the counting is completed, a signal of high level is given to the AND gate 108. The latch circuit 116 latches the output of low level from the counter 112. Since the other input terminal of the AND gate 108 is supplied with the output of high level from the inverter gate 115 through the OR gate 114 in response to the output of low level from the latch circuit 116, such change of the output of the third timer 118 causes a change of the output of the AND gate 108 to a high level, and, therefore, of the output of the OR gate 109 also to a high level, whereby the pulse generating circuit 110 is rendered operative. As has been mentioned above, therefore, the rotor control circuit 113 supplies a normal current to the rotor 19. Thus, the barrel 2 is again moved axially forward.

It should be pointed out here that, at a time either during the first or focusing movement of the barrel 2, or during the subsequent or second movement, the LS switch 39 was or is turned off respectively. Because, as has been described above, the distance adjusting ring 1 overruns one tooth in the first half of each cycle of reciprocating operation and then returns slighty to an exactly one-tooth ahead position, the barrel 2 behaves in such a way that it advances two paces and retreats one pace. Just before the LS switch 39 comes to take the open position continuously, therefore, it will often happen that the LS switch 39 after having once been opened in the first half of the cycle, is closed again in the second half cycle. To prevent a faulty operation from occurring with this, in the present embodiment of the invention, the design of the counter 112 is made in such a way that as, for example, twelve of the ratchet teeth 1b are assigned to each of the cams 1a, for the first nine of this in movement, the signal from the LS switch 39 is ignored. That is, the LS switch 39 is arranged to open before the 9th cycle of reciprocating operation is executed.

Therefore, as the counter 112 counts drive pulses in addition to the number of pulses counted when in focusing, when the total sum of the numbers of drive pulses counte becomes 9, the counter 112 produces an output of high level which is then applied to the latch circuit 116. The latched output of high level from the latch circuit 116 is supplied to the OR gate 114 through the inverter gate 15. Since, at this time, the LS switch 39 has already been open, because the barrel position detecting cirucit 117 gives its output of high level to the other input terminal of the OR gate 114, the output of the OR gate 114 remains at a high level, permitting the barrel 2 to continue being driven to move.

When one of the cams 1a of the distance adjusting ring 1 moves away from the follower 4, the barrel 2 is moved rearward to another initial position by the spring 3 where the LS switch 39 is closed. The output of the barrel position detecting circuit 117 then changes to a low level, whereby the output of the OR gate 114 is changed to a low level, and the outputs of the AND gate 108 and the OR gate 109 are also changed to a low level. Therefore, the current supply to the rotor 19 is stopped, and the reciprocating slide plate 5, ratchet 9, and the rotor 19 are returned to the initial position shown in FIG. 1 by the spring 8. Thus, all the parts except the ditance adjusting ring 1 regain their initial positions, and the sequence of camera operation for one exposure is completed.

It should be noted that the head 9b of the ratchet lever 9 and the abutment surface 15a of the limiting member 15 may be otherwise arranged to necessarily contact with each other at the terminal end of the stroke. In this case, as the ratchet 9 nears the terminal end of its upward movement, it is pushed by the abutment surface 15a toward the inside of distance adjusting ring 1. This produces an advantage that the inertia of the further rotation of the ring 1 is absorbed by the braking effect.

As has been described in greater detail above, according to one embodiment of the invention, the use of means of such simple structure as to provide a slant abutment arranged to contact with the head of the ratchet at the terminal end of advancing movement of the distance adjusting ring, makes it possible to prevent such longer rotation of the distance adjusting ring than the prescribed distance as has been described above with high reliability.

Another embodiment of the invention is next described by reference to FIGS. 6 and 7 where the same reference characters have been employed to denote the similar parts to those shown in the above-described embodiment. Cams 1a are arranged on the circumference of the distance adjusting ring 1 to contact with the barrel 2 through a cam follower 4 so that as the distance adjusting ring 1 turns in a clockwise direction as viewed in FIG. 6, the barrel 2 is axially moved forward. Ratchet teeth 1b are formed in the outer periphery of the distance adjusting ring 1 throughout the entire length thereof. 1c represents detent ratchet teeth whose slope orients to the opposite direction to that of the ratchet teeth 1b and which are arranged on the outer periphery of the distance adjusting ring 1. A stop pawl 15' has a slot in which is engaged a pin 16 fixedly mounted to the base plate (not shown) and is urged by a spring 17 both to turn in a counter-clockwise direction and to slidingly move downward as viewed in FIG. 6. This stop pawl constitutes a feature of the invention.

Figure 6:
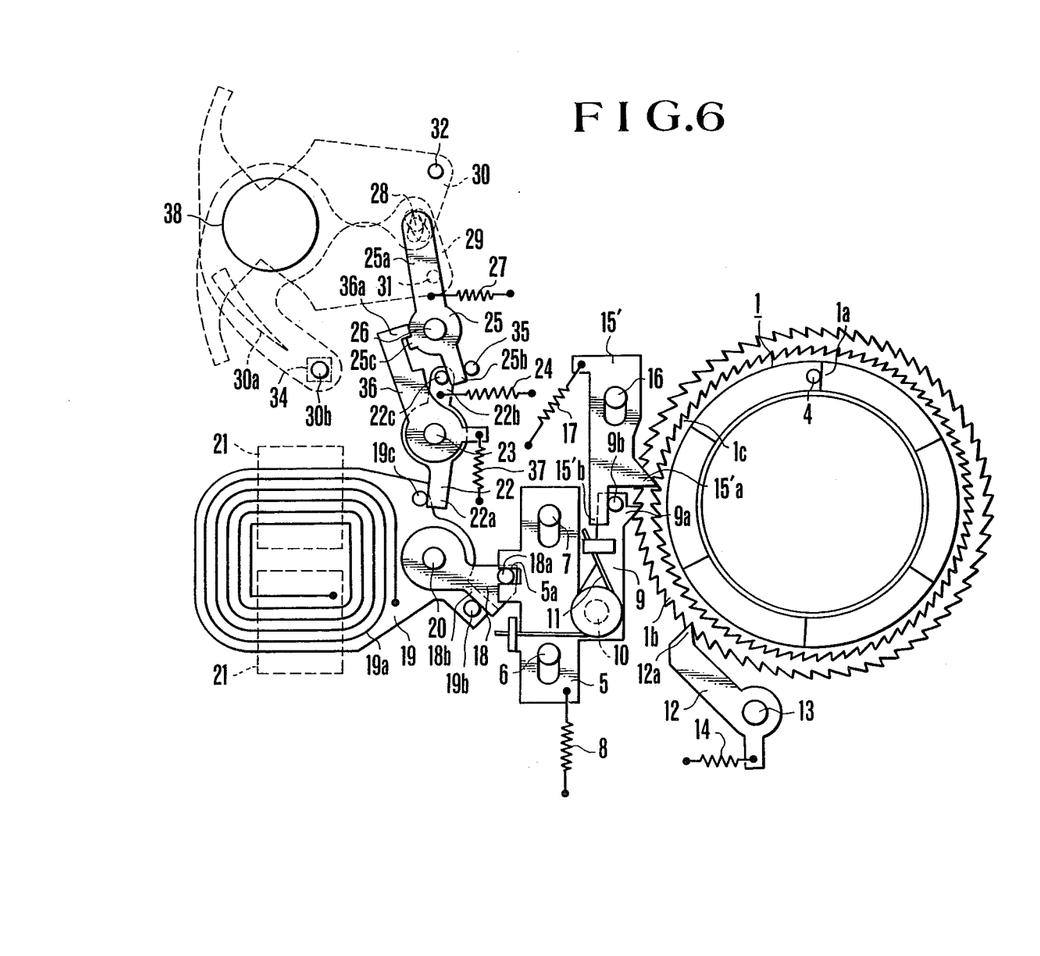
FIG. 6 is similar to FIG. 1 except that another embodiment of the invention is illustrated.
Figure 7:
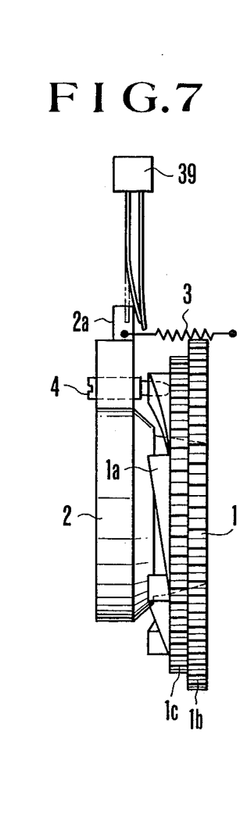
FIG. 7 is a side elevational view illustrating the relationship between the distance adjusting ring and barrel of FIG. 6.

The operation of the device of FIGS. 6 and 7 is described with reference also to FIGS. 3 to 5. With the release button pushed down, when the current supply to the rotor 19 is started similarly to the above-described embodiment, the rotor 19 turns in the counterclockwise direction while its pin 19b pushes the arm 18b of the drive lever 18, whereby the drive lever 18 is also turned in the counterclockwise direction. Because the pin 18a of the drive lever 18 engages in the cutout 5a of the recipracating slide plate 5, the slide plate 5 moves upward. Because the ratchet 9 also moves upward thereby, its pawl 9a pushes one of the drive, ratchet teeth 1b of the distance adjusting ring 1, whereby the distance adjusting ring 1 is turned in the clockwise direction. Because this operation is carried out at very high speed, the distance adjusting ring 1 develops a large inertia. Therefore, this tends to turn the distance adjusting ring 1 to a longer distance than the stroke of the ratchet 9. At a time during the pushing operation of the ratchet in engagement with the distance adjusting ring 1, however, a pawled portion 15'a of the stop pawl 15' comes to engage one of the detent ratchet teeth 1c of the distance adjusting ring 1. Therefore, the stop pawl 15' is pushed upward and the distance adjusting ring 1 further turns beyond the precribed distance. But, being limited by the end of the slot of the stop pawl 15', the distance adjusting ring 1 is prevented from turning two or more teeth. Also, when the distance adjusting ring 1 has turned through the prescribed distance, the pawl lever 12 moves into the next root of the ratchet teeth 1b of the distance adjusting ring 1 to prepare a situation for holding the distance adjusting ring 1 in the one-tooth ahead position. In order to insure that the pawl lever 12 moves into the next root of tooth, the ratchet 9 is made to move a longer distance than the rotation of the distance adjusting ring 1 for one tooth. When the current supply to the rotor 19 is cut off, the distance adjusting ring 1 turns in the reverse direction to the advancing direction to the right position defined by the pawl lever 12. This rotating power can be obtained from the bias force of the spring 17 that urges the stop pawl 15' downward and the rotating power of the spring 3 of the barrel 2 that urges the distance adjusting ring 1 in the counterclockwise direction as it pushes the cam 1a of the distance adjusting ring 1 through the follower 4. Also, when the current supply to the rotor 19 is cut off, the reciprocating slide plate 5 starts to return to the initial position by the bias force of the spring 8. At the same time, the rotor 19 is also returned to the initial position through the ratchet 9 and drive lever 18. At this time, as has been described above, the distance adjusting ring 1 turns in the counterclockwise direction by the bias force of the spring 17 of the stop pawl 15' until it is held by the pawl lever 12. The ratchet pawl 9a turns in the counter-clockwise direction along the slant surface of the ratchet tooth 1b to enter the next root of tooth during this returning operation. At this time, the pin 9b of the ratchet 9 pushes the stop pawl 15' at the arm 15'a thereof, whereby the stop pawl 15' is turned in the clockwise direction. Thereby, the stop pawl 15' disengages from the detent ratchet teeth 1c of the distance adjusting ring, and slidingly moves downward by the bias force of the spring 17 to move into the next detent ratchet tooth 1c. By this series of operations, the distance adjusting ring 1 turns by one tooth of the ratchet teeth 1b, the barrel 2 is moved forward by a distance corresponding to the one tooth by the cam 1a, and the other members return to the initial position of FIG. 6. Such procedure repeats itself a corresponding number of times to the above-described object distance, and the barrel 2 is moved to an in-focus position.

And, the stopping operation of the barrel 2 in the in-focus and the shutter operation are carried out in a similar manner to that described in connection with the above-described embodiment. Then, the barrel is again axially moved forward, returning to the initial position.

According to the second embodiment of the invention, despite the fact that the ratchet mechanism is operated at the high speed to turn the distance adjusting ring at the high speed, it is made possible to prevent the inertia of the distance ring from advancing two or more ratchet teeth in one cycle of reciprocating operation of the ratchet. Moreover, by the arresting mechanism of the invention, the distance adjusting ring is imparted with a bias force of opposite direction so that the distance adjusting ring is turned to the normal position where it is held by the pawl. This makes it to possible operate the ratchet mechanism with high accuracy and reliability.

What is claimed is:

1. A barrel driving device for a camera comprising:
   (a) an axially movable photographic lens barrel;
   (b) moving means for axially moving said photographic lens barrel, said moving means having ratchet teeth and being movable;
   (c) an advancing member arranged in engagement with said tatchet teeth to move said moving means;
   (d) elastic means for engaging said ratchet teet advancing member;
   (e) a pawl member arranged upon engagement with said ratchet teeth to hinder the reverse movement of said moving means;
   (f) a limiting member for preventing said advancing means for moving said moving means more than a predetermined amount against elasticity of said elastic means.

2. A device according to claim 1, wherein said limiting member has a slant surface such as to direct said advancing member toward said moving means.

3. A barrel driving device for a camera comprising:
   (a) an axially movable photographic lens barrel;
   (b) moving means for axially moving said photographic lens barrel,
   said moving means having first ratchet teeth and second ratchet teeth whose tooth direction is opposite to that of said first ratchet teeth, and being movable;
   (c) an advancing member arranged in engagement with said first ratchet teeth to move said moving means;
   (d) a first pawl member arranged upon engagement with said first ratchet teeth to hinder the reverse movement of said moving means; and
   (e) a second pawl member arranged upon engagement with said second ratchet teeth to prohibit movement of said moving means more than necessary,
   said second pawl member operating as said advancing member moves.

4. A device according to claim 3, wherein said moving means is a distance adjusting ring arranged on the outer periphery of said photographic lens barrel.

5. A device according to claim 4, wherein said first ratchet teeth and said second ratchet teeth are arranged on the outer periphery of said distance adjusting ring side in stepped relation.

6. A driving device for camera optics of a camera comprising:
   (a) moving means for displacing said camera optics;
   (b) driving means for driving said moving means, said driving means engaging with said moving means so as to transmit a driving force to said moving means;
   (c) elastic means for engaging said moving means with said driving means; and
   (d) limiting means for prohibiting said moving means from operating beyond a predetermined amount against the strength of said elastic means.

7. A device according to claim 6, further comprising: a lens barrel displacing out of a first position into a second position in response to movement of said moving means.

8. A device according to claim 7, further comprising: urging means for returning said lens barrel to said first position.

9. A device according to claim 8, further comprising prohibiting means for prohibiting said lens barrel from returning to said first position by means of said urging means.

10. A device according to claim 9, further comprising: returning means for returning said lens barrel to said first position by means of said urging means in response to the arrival of said lens barrel to said second position.

11. A device according to claim 9, wherein said limiting means includes prohibiting means for prohibiting said driving means from displacing in a direction along which said driving means disengages from said moving means.

12. A device according to claim 11, wherein said prohibiting means includes a slant surface prohibiting said driving means from displacing in a direction along which said driving means disengages from said moving means.

13. A device according to claim 6, wherein said limiting means includes prohibiting means for prohibiting said driving means from displacing in a direction along which said driving means disengages from said moving means.

14. A device according to claim 13, wherein said prohibiting means includes a slant surface prohibiting said driving means for displacing in a direction along which said driving means disengages from said moving means.

15. A device according to claim 9, wherein said limiting means includes an engaging member engaging with said moving means.

16. A device according to claim 15, wherein said engaging member is designed so as to operate in operative engagement with said driving means.

17. A device according to claim 6, wherein said limiting means includes an engaging member engaging with said moving means.

18. A device according to claim 17, wherein said engaging member is designed so as to operate in operative engagement with said driving means.

19. A device according to claim 6, wherein said driving means includes electromagnetic means which drives said moving means by rotating along a first direction out of a standard position and carries out an exposure operation by rotating toward a second position out of said standard position.

20. A device according to claim 19, wherein said moving means includes focus adjusting means.

21. A driving device for camera optics of a camera comprising:
  (a) moving means for displacing said camera optics by movement, said moving means including a ratchet;
  (b) feeding means engaging with said ratchet so as to move said moving means along a certain predetermined direction, said feeding means moving said moving means along said predetermined direction step by step by carrying out reciprocating motion;
  (c) elastic means for engaging said feeding means with said ratchet; and
  (d) limiting means for prohibiting said moving means from moving beyond a predetermined position against the strength of said elastic means.

22. A device according to claim 21, wherein said limiting means includes prohibiting means for prohibiting said driving means from displacing in a direction along which said driving means disengages from said moving means.

23. A device according to claim 22, wherein said limiting means includes an engaging member engaging with said moving means.

24. A device according to claim 23, wherein said engaging member is designed so as to stop after having moved along said predetermined direction accompanying said moving means and to disengage from said moving means in operative engagement with said driving means.

* * * * *